Patented Jan. 7, 1947

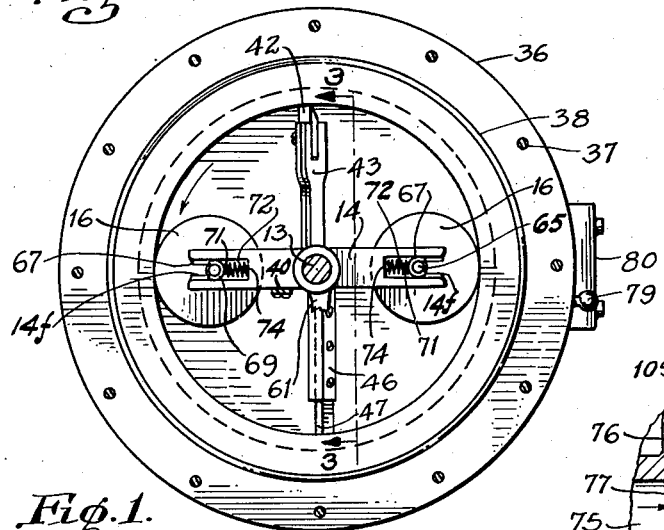

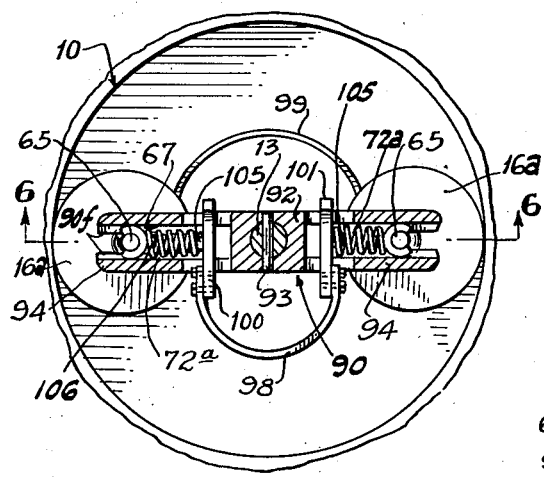
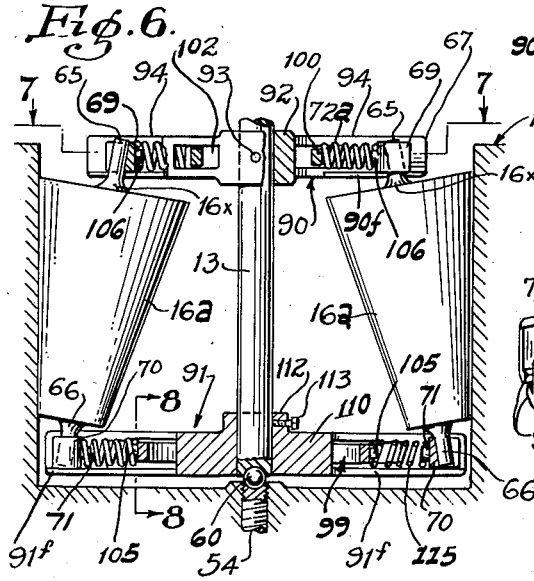
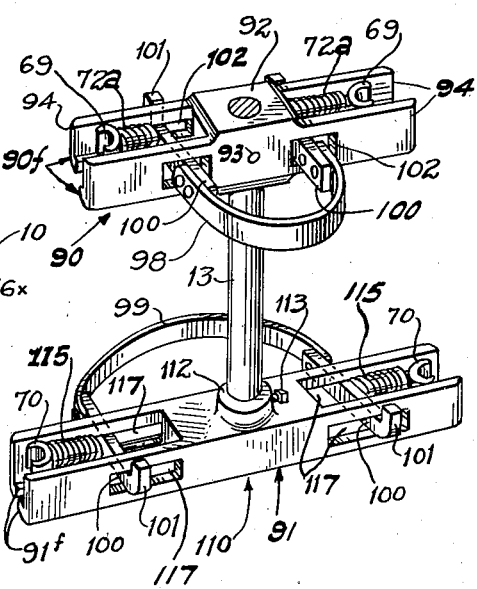
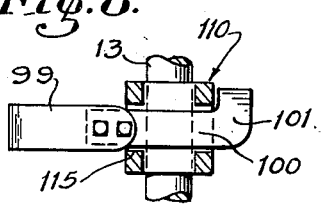

2,413,793

UNITED STATES PATENT OFFICE 2,413,793

VERTICAL AXIS TYPE MIXING AND CHASING MILL

Renwick J. Sharp, Guatemala, Guatemala

Application February 28, 1944, Serial No. 524,247

16 Claims. (Cl. 241—123)

This invention relates to a mixing and grinding machine.

The embodiments of the invention shown in the drawings and hereinafter described are more particularly intended for use in crushing and mixing together the ingredients of a chocolate containing confection, but it is to be understood that, without exceeding the scope of the invention as hereinafter claimed, it is capable of various additional embodiments adapting it for use in a variety of other industries, such, for example, as in paint industries.

Heretofore, difficulty has been encountered in grinding up sugar-containing chocolate in a rapid, satisfactory manner, because the heat generated by such grinding causes caramelization of the sugar; and only the unsweetened chocolate can be ground between stone mills, since the heat generated by them is too high and causes caramelization of the sugar, and in the case of milk powder, which is mostly lactose, this caramelization takes place at even a lower temperature than cane or corn sugar, and therefore, only steel rolls are used to refine the chocolate. Conging takes place later, and where the old style "Pot-Conges" are used they must be kept warm with steam or hot water, and this phase alone of the process sometimes requires as much as 72 hours constant conging. The conges as a rule consist of a plurality of huge pots, and each pot has its stone roller which moves forwardly and backwardly, being pushed and pulled by means of a reciprocating arm operated from the crank portion of a shaft. This is a gentle process, because the stone roller only rolls over the thin film of chocolate caught underneath, and does not twist or gring, for it could not be properly done otherwise with the sugars already in the chocolate. Chocolate with a burnt flavor is repulsive to the taste.

Important objects of this invention are: to provide a machine that will overcome the foregoing drawbacks by removing a great deal of handling of the product; to reduce the amount of floor space required for handling the product; to keep the product from so much contact with open air and dust; to reduce cost of installing the required equipment, so that the small manufacturer can make his own chocolate by the simple process of compounding in his own candy factory the cocoa and fat which he can obtain locally, with sugar (powdered) also obtainable locally, and milk powders, nuts, etc.; and to enable the large scale manufacturer to avail himself of the same advantages as to the elimination of labor required for handling and amount of floor space needed, the invention being well adapted to his use, also, as the machine can be made very large and the number of grinding rollers contained therein can be increased.

Among other objects of the invention are: to provide improved means for imparting a combined gyratory and rotational movement to a crushing and grinding roller, in combination with the interior surface of a container with which it cooperates in performing the crushing and grinding operation, so that one part of the roller will be best adapted to crush the softer lumps or fragments of the mixture being fed to the machine, while another part of the roller will be best adapted to crush the harder lumps or fragments in the material being treated; to provide an improved arrangement of scraping devices which will continuously free the solid portions of the material being treated from the walls of the container provided therefor, and at the same time to cause the scraped off material to be continually kept in circulation so as to be more efficiently acted upon by the crushing means; to provide an improved arrangement of springs whereby the crushing rollers are efficiently continually urged toward the wall of the container, with which they cooperate, and yet are allowed to recede from said wall to the extent required to avoid clogging the machine.

Another and more specific object of the invention is to provide an improved arrangement of frusto-conical crushing rollers whereby the larger portions of said rollers are utilized to more rapidly feed in and crush the softer lumps or fragments of the material while the smaller portions of said rollers are utilized to more slowly feed and crush the harder portions of the material.

Other objects, advantages and features of invention will hereinafter appear.

Referring to the accompanying drawings, which illustrate what are at present deemed to be preferred embodiments of the invention, Fig. 1 is a vertical mid-section of the complete machine, a portion of the base, of the driving means, and of certain interior parts being shown in elevation.

Fig. 2 is a horizontal section taken on line 2—2 of Fig. 1.

Fig. 3 is a sectional detail taken on line 3—3 of Fig. 2.

Fig. 4 is a sectional detail of the vacuum attachment carried by the cover of the container, the plane of section being indicated by line 4—4 on Fig. 1.

Fig. 5 is an enlarged sectional detail of the outlet or delivery portion of the machine taken on line 5—5 of Fig. 1.

Figs. 6 to 9 illustrate a modification.

Fig. 6 is a view showing the frusto-conical crushing and mixing members together with their driving means, a portion of the casing being included in the view. Portions of this view are sectioned, as indicated by line 6—6 on Fig. 7.

Fig. 7 is a section of the structure shown in

Fig. 6 taken on angular line 7—7 of the latter view.

Fig. 8 is an enlarged sectional detail on line 8—8 of Fig. 6.

Fig. 9 is a perspective view illustrating the springs and their mounting means whereby the rotary frusto-conical members of Fig. 6 are urged radially outward into or toward contact with the side wall of the container.

Referring in detail, first to Figs. 1 to 5 of the drawings, among the more important of the parts shown are: the container 10 furnished with a supporting base 11 and having a cover 12, the vertical operating shaft 13 located centrally of said container, the upper cross-arm 14 and lower cross-arm 15, both of said cross-arms having their midlength portions secured to said shaft, and the frusto-conical spirally grooved members 16 which cooperate with the side wall of the container to crush the materials being treated and also aid in mixing together their different ingredients.

The shaft 13 is shown having fixed to its upper end a bevel gear 17 with which meshes a driving bevel gear 18, in turn fixed to shaft 19 of motor 20 mounted upon a bracket 21 fastened to a wall 22.

By preference and as shown the cover 12 is of a somewhat domed character. Said cover is provided centrally with a stuffing box 23 through which the upper part of the shaft 13 extends, said cover having below this stuffing box a downwardly projecting annular boss 24.

At one side of its center the cover 12 is furnished with a tubular intake 25 furnished with a closure plate 26 carried by a handle means which desirably consists of a lid carrier 27 connected to said closure by arms 28 and externally furnished with a hand-hold 29, said carrier being shown removably fastened to the tubular part 25 by means of winged screws 30. The means for holding the closure 26 in place is illustrated in Fig. 1 only, further illustration thereof being deemed unnecessary, as it may be varied to suit those skilled in the art, it only being essential that the closure plate 26 be attached in such a position that its inner face forms a streamline and correspondingly curved continuation of the inner surface of the cover 12 so that a scraping element may pass thereunder in a smooth, efficient manner.

At that side of its center which is opposite to the intake means which has been described the cover is furnished with a tubular vacuum arrangement 31 having secured to it an air-tight cover 32 from which leads a suction pipe 33. Within the tubular part 31 the cover 12 has through it apertures 34, mostly arranged in rows, see Fig. 4, and superjacent to these apertures there extend across said part 31 baffle plates 35, to keep the liquid from being sucked out with the air or vapor to be extracted.

The container 10 has an outwardly directed flange 36 around its top, this flange being utilized to receive bolts 37 whereby said cover 12 is attached, a gasket 38 being provided for said cover 12.

The already mentioned upper cross-arm 14 has riveted or otherwise secured to it an upwardly extending arm 40 which carries a scraper 41 having a scraping edge contoured to conform to the curvature of the underside of the cover 12 and of the closure plate 26. An additional scraping member 42, see Fig. 2, is provided to scrape the side wall of the container. This scraper (detailed in Fig. 3) is carried by upper and lower horizontal arms 43 and 44, the arm 43 being fixed to the shaft 13 in an underlying relation to the cover boss 24 and the arm 44 being fixed to the lower end portion of the driving shaft 13.

Clamp screw and slot arrangements 45 are provided as a means to adjustably secure the scraper 42 to its supporting arms so that its position may be regulated, as required, to give it a proper scraping contact with the side wall of the container.

At the opposite side of the shaft 13 the arm 44 (through which said shaft extends) is furnished with a downwardly offset extension 46 to which is secured a scraper 47 positioned to scrape nearly the entire bottom of the container. This scraper is shown adjustably secured to the arm or extension 46 by means of screw and slot arrangements 48.

The container 10 is shown constructed as a tank having a double side wall portion 10a, 10b and a like double bottom wall 10c, 10d, thus providing within said wall portions water spaces 51 and 52. The container's bottom has a solid central portion 53 through which is tapped a screw-threaded bore into which screws upwardly a bearing screw 54 furnished with a lock nut 55, a good-sized vertical admission bore 56 being provided in axial alinement with said screw, and access to the screw being further facilitated by a horizontal bore 57 which leads from one side of the base to the upper part of said bore 56.

The driving shaft 13 and screw 54 axially aline with each other and their adjacent ends each contain a concavity, thus providing for interposing a bearing ball 60.

In order to prevent too rapid a settling of the solid ingredients of the material being operated on in the container, an agitating or stirring paddle 61 is provided having a sleeve-like shank 62 whereby it is secured to the shaft 13. This paddle is inclined as to its width in such a manner as to create an upward current through-out that portion of the contents of the container upon which it acts. It is shown positioned superjacent to the scraper 47 so as to cooperate therewith to create an upflow of sediment loosened from the bottom of the container by said scraper.

Describing now the preferred mounting means for the frusto-conical crushing and mixing members 16, each of said members has projecting axially from its upper end a trunnion 65 and downwardly from its lower end a trunnion 66. The upper cross-arm 14 has cut into each of its ends a vertical guide slot 67, and a like slot 68 is cut into each end of the lower cross-arm 15. The upper trunnions engage bearing blocks 69 having working fits in the upper slots 67, and the lower trunnions 66 engage bearing blocks 70 having working fits in the lower slots 68. Each of the four bearing blocks (69 or 70) is of the same design and has a periphery extending through more than a semicircle thus preventing it from lateral disengagement in relation to the trunnion with which it cooperates. The open side of each of these bearing blocks is directed away from the driving shaft 13.

The upper blocks 69 have studs 71 surrounded by the outer ends of spiral compression springs 72, and the lower blocks 70 have similar studs 71 surrounded by the outer ends of like springs 73. All these springs have their inner ends coiled around studs 74 provided for them on the cross arms 14 and 15. The upper bearing blocks are supported by flanges 14f and the lower blocks 70 are supported by inwardly directed bottom flanges 15f in the end portions of the cross-bar 15.

The bearing blocks 69 and 70 all have their trunnion-receiving recesses positioned in such a manner as to, in effect, form semi-cylindrical inclined bores through them within which the trunnions with which they cooperate workably fit. There are fillets 16x around the bases of the trunnions 65.

In the lower right portion of the container (see Fig. 1) is shown an outlet 75 controlled by a vertically operable door plate 76 having a vertical rack 77 projecting from its outer face which is engaged by a gear 78 operated by a swingable handle 79. An apron 80, spaced outwardly from the mouth of the outlet 75 and extending to a point therebelow, directs downwardly the outflowing product. Said apron (see Fig. 5) carries at each side a vertical attaching flange 81 whereby it is secured to the container, said apron being rectangularly shaped as viewed in horizontal section. A pair of spring-pressed casters 82 are shown having shank pins 83 extending slidably through openings provided for them in the apron 80, these casters engaging the outer side of the door 76 to reduce the friction incident to the operation of said door.

The liquid-containing space within the double wall of the container is provided with an inlet controlled by the plug 85 and with a bottom outlet controlled by a plug 86, so that either a heating or cooling liquid may be circulated through the walled-in space surrounding the interior of the container. The inner bottom wall 19d is shown relatively thin, this being desirable to cause a more rapid bottom heating or cooling, as the case may be, of the contents of the container. A thermometer 88 is shown positioned to indicate externally of the container the temperature of the liquid within its double wall.

Describing now the modified means shown in Figs. 6 to 9 for mounting the frusto-conical members 16 and controlling their action, the shaft 13 has fixed to it an upper cross-bar 90 and a lower cross-bar 91, corresponding, respectively to the cross-bars 14 and 15 already described. The midlength portion of the cross-bar 90 consists of a block 92 with a vertical bore to fit around the shaft 13 to which said block is secured by a pin 93. From each end of this block projects a pair of horizontal arms 94, the arms of each pair being parallel and horizontally spaced apart, as shown, to have slidably fitted between them the bearing blocks 69. The upper cross-bar 90 has flanges 90f to support the upper bearing blocks, and the lower cross-bar 91 has flanges 91f to support the lower bearing blocks.

The principal difference between the modification and the structure first described resides in the provision of additional springs 98 and 99, floatably mounted, to regulate the action of the frusto-conical members 16a. Describing next the upper spring 98 and parts cooperating with it, said spring consists of an arcuate horizontal strip of resilient metal each limb of which is lengthened by having riveted to it an arm 100 which terminates in a short upwardly directed finger 101; opposed slots 102 being formed through the inner portions of the aforesaid paired arms 94, said arms 100 being fitted within these slots for lateral shifting. In assembling this part of the structure the arms 100 are put into place as shown with their fingers 101 directed upwardly and then the straight end portions of said arms are bolted or otherwise secured to the end portions of the arcuate spring 98. Each arm 100 carries an outwardly directed stud 105, and each bearing block 69, at its side of the structure, carries a stud 106, thereby providing mounting means for spiral compression springs 72a.

Most of the parts which cooperate with the lower arcuate spring 99 are constructed in the same manner as the corresponding parts already described in connection with the upper spring 98, and are therefore numbered the same, but some of these parts are different and will now be described using different reference numerals.

The lower cross arm 91 has a longer central body portion 110 and is shown furnished with an upwardly directed hub or annular rise 112 which carries a set screw 113 for clamping this cross-bar to the driving shaft 13.

The scraping and stirring members shown in Figs. 1, 2 and 3 are not shown in Figs. 7, 8 and 9, as their construction and use is apparent from the disclosure of the former views.

In the modification the lower bearing blocks 70 and their studs 71 are unmodified, but are engaged by the outer ends of spiral compression springs 115, the inner ends of said springs surrounding bosses 105 (as above) on the lower shiftable arms 100. These lower arms are of the same size and shape as the corresponding upper ones and, together with their fingers 101, are therefore lettered the same, but they each operate in paired slots 117 which are longer than the corresponding upper slots 102.

In the operation of the spring-controlled frusto-conical rollers a firm pressure of each roller against the side wall of the container is maintained at all times in both embodiments of the invention and, in the embodiment thereof wherein the floating arcuate springs 98 and 99 are used, an additional range of yieldability is afforded because, when a large lump is encountered by one of the rollers, not only the arm of the arcuate spring at that side of the container is deflected, but also the opposite arm of such spring yields, thereby increasing the range of yieldability.

In both embodiments of the invention, centrifugal force aids in the spring means urging the rollers toward the side wall of the container.

The large upper portions of the frusto-conical rollers are best adapted to crush the soft, pasty masses or lumps which the stirring means tends to move toward the top of the container, while the smaller, more concentrated masses will tend to sink and be acted upon by the smaller end portions of the rollers, which are better adapted to act upon them. In the modification the rollers 16a are shown having their curved faces ungrooved, the use of the grooved type of roller being considered optional.

It should be understood that the present disclosure is for the purpose of illustration only and that this invention includes all modifications and equivalents which wall within the scope of the subject matter claimed.

What is claimed is:

1. In a machine of the kind described, a container having an upstanding side wall with a cylindrical inner surface, a driving shaft mounted axially within said container, roller mounting means comprising bearing blocks mounted in guide slots fixed to said shaft, spirally grooved, frusto-conical rollers having their larger ends directed upwardly and provided with trunnions projecting from their upper and lower ends mounted in said bearing blocks in an opposed relation to each other and maintaining the outer surfaces of said frusto-conical rollers in a crushing and grinding relation to said wall, springs carried by said mounting means in said guide slots and urging the trunnions of said rollers toward a contacting relation to said wall, and means to slidably support said bearing blocks and the rollers carried thereby in said guide slots, said means comprising flanges projecting inwardly into said guide slots along each side thereof.

2. The subject matter of claim 1, and a bowed spring having its free end portions horizontally extending through cut-away portions in said roller mounting means at each side of said shaft and being longitudinally shiftable therein against the inner ends of the springs occupying said guide slots.

3. In a machine of the kind described, a container having an upstanding side wall with a cylindrical inner surface, a driving shaft mounted axially within said container, two vertically spaced apart cross-arms fixed to said shaft, said cross-arms having longitudinally extending guides in their end portions, bearing blocks in said guides, rollers mounted within said container in a grinding relation to said side wall, said rollers having trunnions operatively connected to said bearing blocks, and bowed springs having end portions carried by said cross-arms at opposite sides of said shaft and positioned so to act upon said bearing blocks to urge said rollers toward said wall.

4. In a machine of the kind described, a container having an upstanding side wall with a cylindrical inner surface, a driving shaft mounted axially within said container, a cross-arm fixed to said shaft, said cross-arm having a longitudinal guide portion at each side of its midlength, a bearing block in each of said guide portions, crushing means in a cooperative relation to each of said bearing blocks and to the aforesaid container wall, and resilient means carried by said cross-arm and tending to move said bearing blocks outwardly from said shaft, said resilient means comprising a bowed spring having end portions attached to said cross-arm at opposite sides of said shaft, said end portions of said spring being operatively connected to said bearing blocks.

5. The subject matter of claim 4, and a spiral compression spring positioned to convey pressure from each end portion of said bowed spring to the bearing block with which is cooperates.

6. In a machine of the kind described, a container having an upstanding side wall with a cylindrical inner surface, a driving shaft mounted axially within said container, a cross-arm fixed to said shaft, said cross-arm having a longitudinal guide portion at each side of its midlength, a bearing block in each of said guide portions, crushing means in a cooperative relation to each of said bearing blocks and to the aforesaid container wall, an arcuate spring structure, said cross-arm having cut-away portions at each side of said shaft and an end portion of said spring structure extending horizontally through each of said cut-away portions and being therein shiftable longitudinally of said cross-arm, and a spiral compression spring bridging the space between each of said bearing blocks and the end portion of the aforesaid arcuate spring structure at that side of the aforesaid shaft.

7. In a machine of the kind described, a container having an upstanding side wall with a cylindrical inner surface, a driving shaft mounted axially within said container, a cross-arm fixed to said shaft, said cross-arm having a longitudinal guide portion at each side of its midlength, a bearing block in each of said guide portions, crushing means in a cooperative relation to each of said bearing blocks and to the aforesaid container wall, roller mounting means carried by said shaft comprising a horizontally extending cross-arm having at its midlength portion fixed to said shaft, a pair of upstanding crushing rollers one of which is located at one end of said cross-arm and the other at the opposite end thereof, both of said rollers being in a cooperative crushing relation to the side wall of said container, said rollers each having a trunnion which is operatively connected with the adjacent end portion of said cross-arm and is movable radially in relation to the aforesaid shaft, and a floating spring carried by said cross-arm, one end portion of said spring being operatively connected with the trunnion of one of said rollers and the other end portion of said spring being operatively connected with the trunnion of the other of said rollers, whereby, when a radially inward movement of either of said trunnions takes place independently of the other both the arms of said floating spring are deformed to compensate therefor.

8. In a machine of the kind described, a container having an upstanding side wall with a cylindrical inner surface, an upstanding driving shaft located centrally of said container, a cross-arm fixed to said shaft, said cross-arm having a longitudinal guide portion at each side of its midlength, a bearing block in each of said guide portions, crushing means in a cooperative relation to each of said bearing blocks and to the aforesaid container wall, resilient means carried by said cross-arm and tending to move said bearing blocks outwardly from said shaft, said resilient means comprising a bowed spring having end portions attached to said cross-arm at opposite sides of said shaft, said end portions of said spring being operatively connected to said bearing blocks, a scraper fixed to said shaft and positioned to scrape the bottom of the container when the shaft rotates, and a paddle fixed to said shaft and extending radially therefrom in the lower portion of said container at a higher level than said scraper, said paddle being superjacent to said scraper and so inclined as to produce an upward current of the part of the contents of the container upon which it acts.

9. In a machine of the kind described, a container having an upstanding side wall with a cylindrical surface, a driving shaft mounted axially within said container, upper and lower parallel cross-arms fixed to said shaft, a roller carried by and bridging the distance between said cross-arms at each side of said shaft, said rollers being in a crushing or grinding relation to said wall, a scraper having an upwardly and downwardly extending scraping portion in engagement with said wall, means whereby said scraper is maintained in a fixed relation to said shaft to gyrate therearound along with said rollers, and resilient means carried by said cross-arms and tending to move said rollers outwardly from said shaft, said resilient means comprising a bowed spring having end portions attached to each said cross-arm at opposite sides of said shaft, said end portions of said springs being operatively connected to the ends of said rollers.

10. In a machine of the kind described, a container having an upstanding side wall with a cylindrical inner surface, a driving shaft mounted axially within said container, upper and lower parallel cross-arms fixed to said shaft, said cross-arms having a longitudinal guide-portion at each side of their midlength, a bearing block slidably mounted in each of said guide portions, frusto conical rollers having their larger ends directed upwardly and provided with axially alined trunnions projecting from their upper and lower ends journalled in said bearing blocks, said rollers bridging the distance between said cross-arms at each side of said shaft, the faces of said rollers being in a crushing or grinding contact with said wall, resilient means carried by said cross-arms tending to move said bearing blocks outwardly from said shaft, and means to slidably support said bearing blocks and in turn the rollers carried thereby in said guide portions, said means comprising flanges projecting inwardly into said guide portions along each side thereof, a dome-shaped cover for said container, and a scraper having a scraping edge contoured to conform to the curvature of the underside of the cover carried by said upper cross-arm.

11. In a machine of the kind described, a container having an upstanding side wall with a cylindrical inner surface, a driving shaft mounted axially within said container, upper and lower parallel cross-arms fixed to said shaft, said cross-arms having a longitudinal guide-portion at each side of their midlength, a bearing block slidably mounted in each of said guide portions, frusto conical rollers having their larger ends directed upwardly and provided with axially alined trunnions projecting from their upper and lower ends journalled in said bearing blocks, said rollers bridging the distance between said cross-arms at each side of said shaft, the faces of said rollers being in a crushing or grinding contact with said wall, resilient means carried by said cross-arms and tending to move said bearing blocks outwardly from said shaft, said frusto-conically shaped rollers having their frusto-conical faces spirally grooved, and means to slidably support said bearing blocks and in turn the rollers carried thereby in said guide portions, said means comprising flanges projecting inwardly into said guide portions along each side thereof.

12. In a machine of the kind described, a container having an upstanding side wall with a cylindrical inner surface, a driving shaft mounted axially within said container, upper and lower parallel cross-arms fixed to said shaft, said cross-arms having a longitudinal guide-portion at each side of their midlength, a bearing block slidably mounted in each of said guide portions, frusto-conical rollers having their larger ends directed upwardly and provided with axially alined trunnions projecting from their upper and lower ends journalled in said bearing blocks, said rollers bridging the distance between said cross-arms at each side of said shaft, the faces of said rollers being in a crushing or grinding contact with said wall, resilient means carried by said cross-arms and tending to move said bearing blocks outwardly from said shaft, said resilient means comprising a bowed spring having end portions attached to said cross-arms at opposite sides of said shaft, said end portions of said spring being operatively connected to said bearing blocks, a spiral compression spring positioned to convey pressure from each end portion of said bowed spring to said bearing blocks with which it co- operates, and means to slidably support said bearing blocks and in turn the rollers carried thereby in said guide portions, said means comprising flanges projecting inwardly into said guide portions along each side thereof.

13. In a machine of the kind described, a container having an upstanding side wall with a cylindrical inner surface, a driving shaft mounted axially within said container, upper and lower parallel cross-arms fixed to said shaft, said cross-arms having a longitudinal guide-portion at each side of their midlength, a bearing block slidably mounted in each of said guide portions, frusto conical rollers having their larger ends directed upwardly and provided with axially alined trunnions projecting from their upper and lower ends journalled in said bearing blocks, said rollers bridging the distance between said cross-arms at each side of said shaft, the faces of said rollers being in a crushing or grinding contact with said wall, resilient means carried by said cross-arms and tending to move said bearing blocks outwardly from said shaft, said resilient means comprising a bowed spring having end portions attached to said cross-arms at opposite sides of said shaft, said end portions of said spring being operatively connected to said bearing blocks, and means to slidably support said bearing blocks and in turn the rollers carried thereby in said guide portions, said means comprising flanges projecting inwardly into said guide portions along each side thereof.

14. In a machine of the kind described, a container having an upstanding side wall with a cylindrical inner surface, a driving shaft mounted axially within said container, a cross-arm fixed to said shaft, said cross-arm having a longitudinal guide portion at each side of its midlength, a bearing block in each of said guide portions, crushing means in a cooperative relation to each of said bearing blocks and to the aforesaid container wall, and an arcuate spring structure, said cross-arm having a cut-away portion at each side of said shaft and an end portion of said spring structure extending horizontally through each of said cut-away portions and being therein shiftable longitudinally of said cross-arm to move said bearing blocks outwardly.

15. In a machine of the kind described, a container having an upstanding side wall with a cylindrical inner surface, a driving shaft mounted axially within said container, upper and lower cross-arms fixed to said shaft, said cross-arms having longitudinal guide portions at each side of their midlength, bearing blocks slidably mounted in each of said guide portions, crushing means in a cooperative relation to each of said bearing blocks and to the aforesaid container wall, and an upper and lower arcuate spring structure, said upper and lower cross-arms having cut-away portions at each side of said shaft and an end portion of each of said upper and lower spring structures extending horizontally through each of said cut-away portions and being therein shiftable longitudinally of said cross-arms to move said bearing blocks outwardly.

16. The subject matter of claim 15 and, a spiral compression spring bridging the space between each of said bearing blocks and the end portions of the aforesaid arcuate spring structures at that side of the aforesaid shaft.

RENWICK J. SHARP.